(12) United States Patent
Gosling et al.

(10) Patent No.: US 9,170,319 B2
(45) Date of Patent: Oct. 27, 2015

(54) DETERMINING POSITION OF UNDERWATER NODE

(71) Applicant: GO SCIENCE GROUP LTD, Virgin Islands (GB)

(72) Inventors: Harry George Dennis Gosling, Bristol (GB); Roman Lloyd Kingsland, Bristol (GB); Arran James Holloway, Bristol (GB)

(73) Assignee: GO SCIENCE GROUP LTD, Tortola (VG)

( * ) Notice: Subject to any disclaimer, the term of this patent is extended or adjusted under 35 U.S.C. 154(b) by 0 days.

(21) Appl. No.: 14/381,479

(22) PCT Filed: Feb. 28, 2013

(86) PCT No.: PCT/GB2013/050491
§ 371 (c)(1),
(2) Date: Aug. 27, 2014

(87) PCT Pub. No.: WO2013/128187
PCT Pub. Date: Sep. 6, 2013

(65) Prior Publication Data
US 2015/0124565 A1    May 7, 2015

(30) Foreign Application Priority Data
Mar. 2, 2012 (GB) .................................. 1203669.5

(51) Int. Cl.
*G01S 5/30* (2006.01)
*G01S 5/00* (2006.01)

(52) U.S. Cl.
CPC *G01S 5/30* (2013.01); *G01S 5/0009* (2013.01)

(58) Field of Classification Search
CPC ............... G01S 1/56; G01S 1/64; G01S 5/30; G01S 5/0009; G01S 5/0018; G01S 5/0045; G01S 5/0081
See application file for complete search history.

(56) References Cited

U.S. PATENT DOCUMENTS

| 3,160,886 | A | * | 12/1964 | Battle, Jr. ...................... 342/400 |
| 4,635,236 | A | | 1/1987 | Roberts |
| 5,119,341 | A | | 6/1992 | Youngberg |
| 5,331,602 | A | | 7/1994 | McLaren |

(Continued)

FOREIGN PATENT DOCUMENTS

| GB | 2113391 | 8/1983 |
| JP | H11-202042 | 7/1990 |

(Continued)

OTHER PUBLICATIONS

Chen et al., "A New Underwater Acoustic Communication System Based on Fractional Fourier Transform," *Proc. 2010 IEEE Int'l. Conf. Infor. Automat.*, 413-418 (Jun. 2010).
Sari et al., "Underwater Acoustic Voice Communications Using Digital Pulse Position Modulation," *OCEANS '97. MTS/IEEE Conference Proceedings*, vol. 2: 870-874 (Oct. 1997).
Search Report and Written Opinion issued in Int'l App. No. PCT/GB2013/050491 (2013).

*Primary Examiner* — Isam Alsomiri
*Assistant Examiner* — Hovhannes Baghdasaryan
(74) *Attorney, Agent, or Firm* — Barnes & Thornburg LLP; Mark J. Nahnsen (57) ABSTRACT

A method of determining the position of an underwater node. The positions of three or more transmitters are determined. Each transmitter transmits at least four pulses, wherein a time difference between each pulse and a previous one of the pulses is proportional to a respective co-ordinate of the position of the transmitter. The pulses are received at the underwater node and decoded by measuring the delays between them, thereby determining the co-ordinates of the transmitters. The range of each transmitter relative to the underwater node is also determined. Finally the position of the underwater node is determined in accordance with the co-ordinates and ranges. Any errors in the measurements of the delays between the pulses only translate into small errors in the determined position because of the proportionality between the delays and the coordinates. Therefore if there is a gradual decrease of signal-to-noise ratio then the accuracy of the position estimate also degrades gradually. Also, the use of pulse position modulation provides a low computation overhead in decoding and encoding.

15 Claims, 8 Drawing Sheets

(56) References Cited

U.S. PATENT DOCUMENTS

| | | |
|---|---|---|
| 5,504,279 A | 4/1996 | Sizer |
| 2002/0064092 A1 | 5/2002 | Nishimura |
| 2005/0098377 A1 | 5/2005 | Bary et al. |

FOREIGN PATENT DOCUMENTS

| | | |
|---|---|---|
| JP | H10-111352 | 4/1998 |
| WO | WO 2007/022233 | 2/2007 |
| WO | WO 2011/084483 | 7/2011 |

* cited by examiner

DETERMINING POSITION OF UNDERWATER NODE

CROSS REFERENCE TO RELATED APPLICATIONS

This application is a U.S. nationalization under 35 U.S.C. §317 of International Application No. PCT/GB2013/050491, filed Feb. 28, 2013, which claims priority to United Kingdom Patent Application No. 1203669.5, filed Mar. 2, 2012. The disclosures set forth in the reference applications are incorporated herein by reference in their entireties.

FIELD OF THE INVENTION

The present invention relates to a method and apparatus for determining the position of one or more underwater nodes.

BACKGROUND OF THE INVENTION

A known method and apparatus for determining the position of an underwater node is described in U.S. Pat. No. 5,119,341. A plurality of buoys determine their positions based on Global Positioning System (GPS) navigation satellites and emit acoustic underwater data messages which contains this position. An underwater vehicle receives the messages and determines its position therefrom. Spread spectrum encoding is used to allow a single beacon carrier frequency for all buoys. Alternatively separate and locally-unique beacon carrier frequencies can be assigned to each buoy.

SUMMARY OF THE INVENTION

A first aspect of the invention provides a method of determining the position of an underwater node, the method comprising:
a) determining the positions of three or more transmitters;
b) transmitting from each transmitter at least four pulses, wherein a time difference between each pulse and a previous one of the pulses is proportional to a respective co-ordinate of the position of the transmitter;
c) receiving the pulses at the underwater node;
d) decoding the pulses received at the underwater node by measuring the delays between them, thereby determining the co-ordinates of the transmitters;
e) determining the range of each transmitter relative to the underwater node; and
f) determining the position of the underwater node in accordance with the co-ordinates determined in step d) and the ranges determined in step e), for instance by multi-lateration.

A further aspect of the invention provides apparatus for determining the position of an underwater node, the apparatus comprising: three or more transmitters, each transmitter comprising: means for determining the position of the transmitter; and a processor arranged to cause the transmitter to transmit at least four pulses, wherein a time difference between each pulse and a previous one of the pulses is proportional to a respective co-ordinate of a position of the transmitter; and a node comprising: a receiver for receiving the pulses; and a processor arranged to decode the pulses received at the node by measuring the delays between them, thereby determining the co-ordinates of the transmitters; process the pulses received at the node to determine the ranges of the transmitters relative to the node; and determine the position of the node in accordance with the positions and ranges of the transmitters.

The present invention encodes the positions of the transmitters by pulse-position-modulation, wherein a time difference between each pulse and a previous one of the pulses is proportional to a respective co-ordinate of the position of the transmitter. Any errors in the measurements of the delays between the pulses only translate into small errors in the determined position because of the proportionality between the delays and the coordinates. Therefore if there is a gradual decrease of signal-to-noise ratio then the accuracy of the position estimate also degrades gradually. Also, the use of pulse position modulation provides a low computation overhead in decoding and encoding.

The node may be stationary. However more preferably the method further comprises determining a velocity of the node, wherein the position of the underwater node is determined in accordance with the determined velocity of the node. This enables the method to takes account of the fact that the node may have moved between receiving the first pulse and the last pulse, so step f) can for instance determine the position at the time that one of the pulses (for instance the first or last pulse) was received.

Typically the range of each transmitter is determined in step e) by detecting a time taken for at least one of the pulses (for instance the first pulse) to travel from the transmitter to the underwater node. This may be determined for example by detecting the time of arrival of the pulse, and determining the time difference between the time of arrival and a known transmission time for the pulse.

Preferably the time difference $\Delta t$ between each pulse and a previous one of the pulses is proportional to a respective co-ordinate (c) of the position of the transmitter node in accordance with the equation $c=kt$, where $k$ is a co-efficient of proportionality.

Preferably at least the second, third and fourth pulses from each transmitter are chirps which vary monotically between a first frequency at the beginning of the pulse and a second frequency at the end of the pulse. The frequency or period may vary at a constant rate or a non-constant rate.

Preferably at least the second, third and fourth pulses vary in frequency with respect to time in accordance with a pre-determined function, which may or may not be monotonic The pulses from the transmitters may be time-division-multiplexed, but more preferably the pulses from the transmitters have different frequencies or codes and are de-multiplexed at the underwater node based on their code or frequency. Typically the pulses from the transmitters occupy non-overlapping frequency bands, which are preferably non-adjacent.

The method may be performed by a single node only, but more typically it is performed simultaneously by two or more nodes, most preferably more than 10 and potentially 100 or more.

The delays between the pulses may be measured in step d) by directly measuring their relative times of arrival. However more preferably the delays between the pulses are measured in step d) by: generating a signal from the received pulses; cross-correlating the signal with a pulse function to generate a cross-correlation signal; and measuring the measuring the delay between peaks in the cross-correlation signal.

Preferably a time varying gain is applied to the cross-correlation signal until a first peak is detected; then the value of the gain is detected at that point; and the detected value of the gain is applied to subsequent parts of the cross-correlation signal.

The nodes may be sensors such as seismic sensors, or any other node which needs to know its location accurately.

The pulses may be acoustic pulses or electromagnetic pulses.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
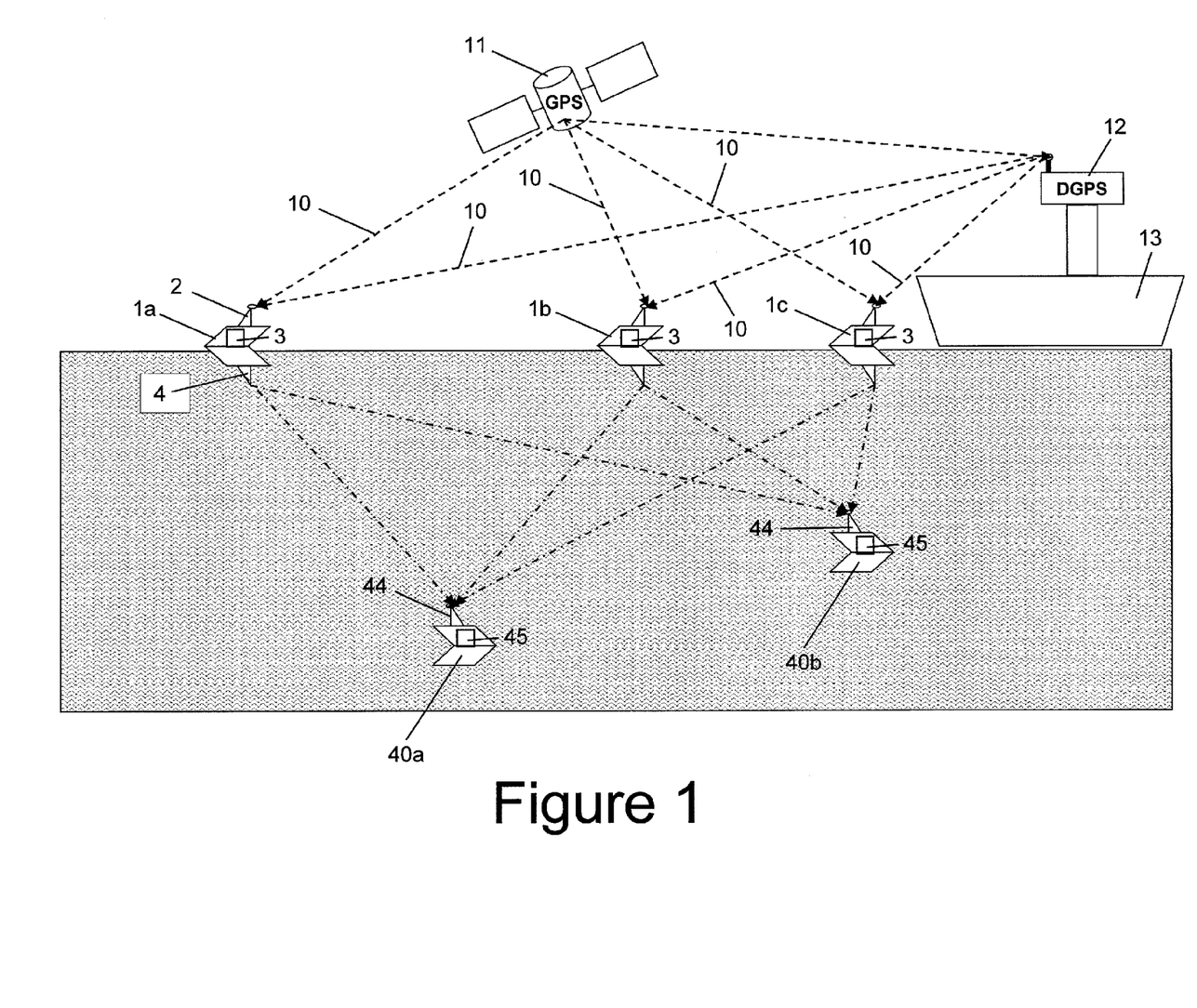
FIG. 1 shows an underwater communication system.

FIG. 1 shows an underwater communication system. Three transmitter buoys 1a-c are deployed on the surface of the water. Each buoy has a Global Positioning System (GPS) antenna 2, a processor 3 and an acoustic antenna 4.

The GPS antenna 2 receives GPS data signals 10 from a GPS satellite 11 and from a Differential GPS (DGPS) reference station 12 on a surface vessel 13. The processor process the GPS data signals 10 to determine the position of the buoy 1 in a known manner.

Figure 2:
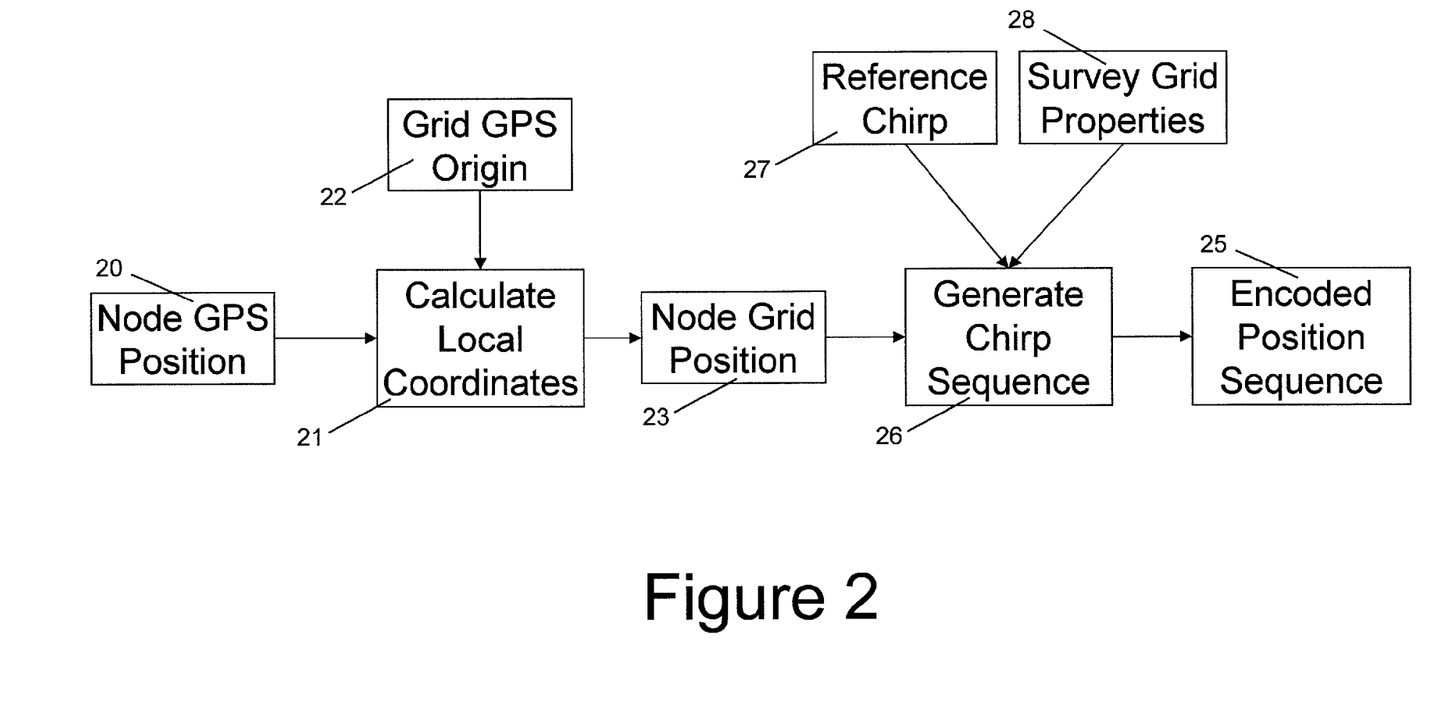
FIG. 2 shows a method of encoding a position sequence.
Figure 3:
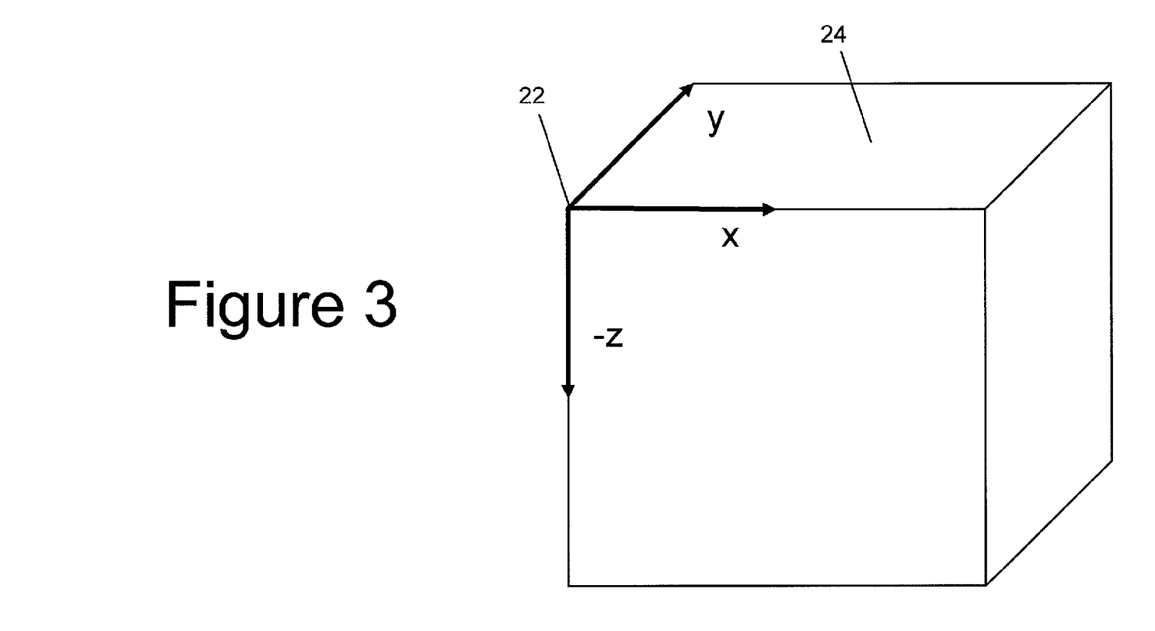
FIG. 3 shows a survey space.

FIG. 2 is a schematic diagram illustrating the method steps performed by the processors 3. The position of the buoy 1a-c is first determined in GPS coordinates (latitude, longitude and altitude) and stored as position data 20. This data 20 is then transformed at step 21 into a local coordinate system having an origin 22 (again, defined in terms of GPS coordinates) to give a grid position 23. This process is illustrated in FIG. 3 which shows an origin 22, and a cube 24 with orthogonal X, Y and Z axes meeting at the origin. Any position within the cube can be defined by three grid coordinates x, y, z relative to the origin 22.

Figure 4:
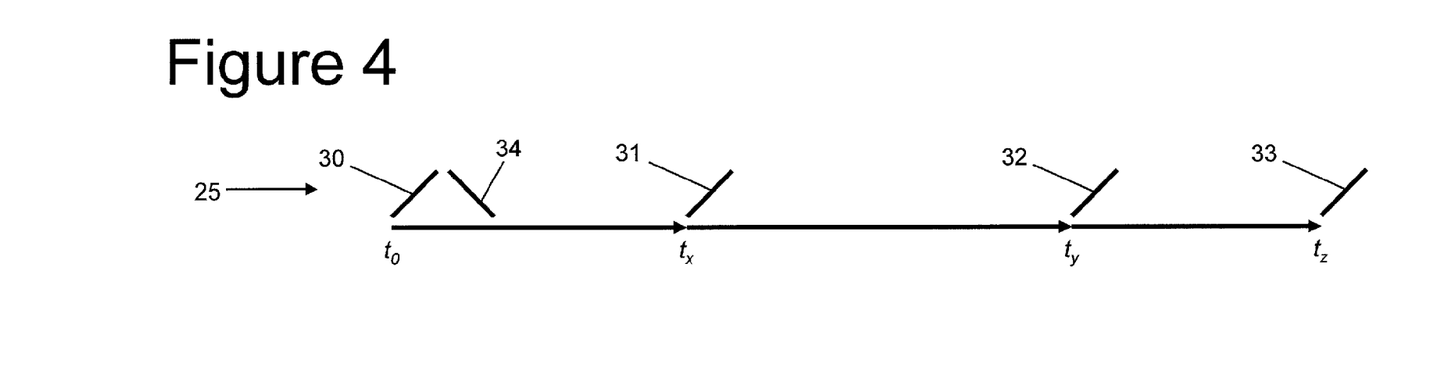
FIG. 4 shows a pulse train with the X axis being the time dimension and the Y axis being the frequency dimension.

The processor 3 is programmed to cause the acoustic transmitter 4 to transmit a chirp pulse position modulated acoustic pulse train 25 which encodes the xyz position of the buoy 1 as shown in FIG. 4.

This pulse train 25 is encoded from the grid position data 23 at step 26 in accordance with reference chirp data 27 and survey grid property data 28. The reference chirp data 27 defines for each a buoy a start frequency F1, a finish frequency F2, and a monotonic function which defines how the chirp frequency changes from F1 to F2 with respect to time (for instance the frequency might change at a constant rate between F1 and F2). The survey grid property data 28 defines the size of the cube 24 in meters (for instance 4096 m by 4096 m by 4096 m), the resolution required (for instance 0.25 m) and the maximum time between adjacent pulses in the pulse sequence (for instance 0.1 s).

The pulse train 25 shown in FIG. 4 comprises four low-to-high-frequency chirps 30-33 and a single high-to-low-frequency chirp 34. The low-to-high-frequency chirps 30-33 have a frequency which increases at a constant rate between a first low frequency F1 at the beginning of the pulse and a second high frequency F2 at the end of the pulse. The low-to-high-frequency chirps 30-33 start at times $t_0$, $t_x$, $t_y$, and $t_z$, respectively. The high-to-low-frequency chirp 34 has a frequency which decreases at a constant rate between a first high frequency at the beginning of the pulse and a low high frequency at the end of the pulse. The chirps 30,34 are used to signal the start of the pulse sequence.

The chirps in the pulse train of FIG. 4 have a frequency which changes at a constant rate. In an alternative pulse train (not shown) the chirps may instead have a period which changes at a constant rate.

The time difference ($\Delta t$) between each acoustic pulse and a previous one of the acoustic pulses is encoded at step 26 to be directly proportional to a respective co-ordinate (x,y,z) of the position of the buoy 1a-c in accordance with the equation:

$$\Delta t = \text{co-ordinate } (x,y,z) \times (k)$$

where k is a co-efficient of proportionality which in this case is 4096/0.1 m/s. In other words:

$$t_0 - t_x = X \text{ co-ordinate in meters} \times (0.1/4096)$$

$$t_x - t_y = Y \text{ co-ordinate in meters} \times (0.1/4096)$$

$$t_y - t_z = Z \text{ co-ordinate in meters} \times (0.1/4096)$$

Figure 5:
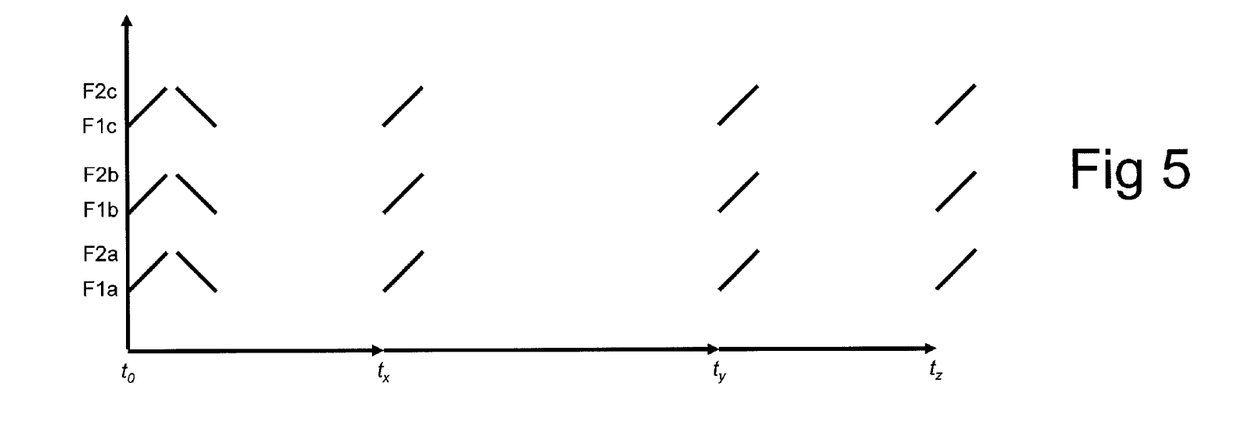
FIG. 5 shows three simultaneous pulse trains in separate frequency bands.

The chirps from the buoys 1a-c are frequency-division-multiplexed as shown in FIG. 5. In this example the first buoy 1a transmits from F1a to F2a, the second buoy 1b transmits from F1b to F2b, and the third buoy 1c transmits from F1c to F2c. The chirps occupy non-adjacent and non-overlapping frequency bands so that F1a<F2a<F1b<F2b<F1c<F2c. The three pulse trains are then de-multiplexed at the underwater vehicles based on their frequency by a process of cross-correlation as described below. By way of example the frequency F1a may be of the order of 10 kHz and the frequency F2c might be of the order of 15 kHz.

Figure 6:
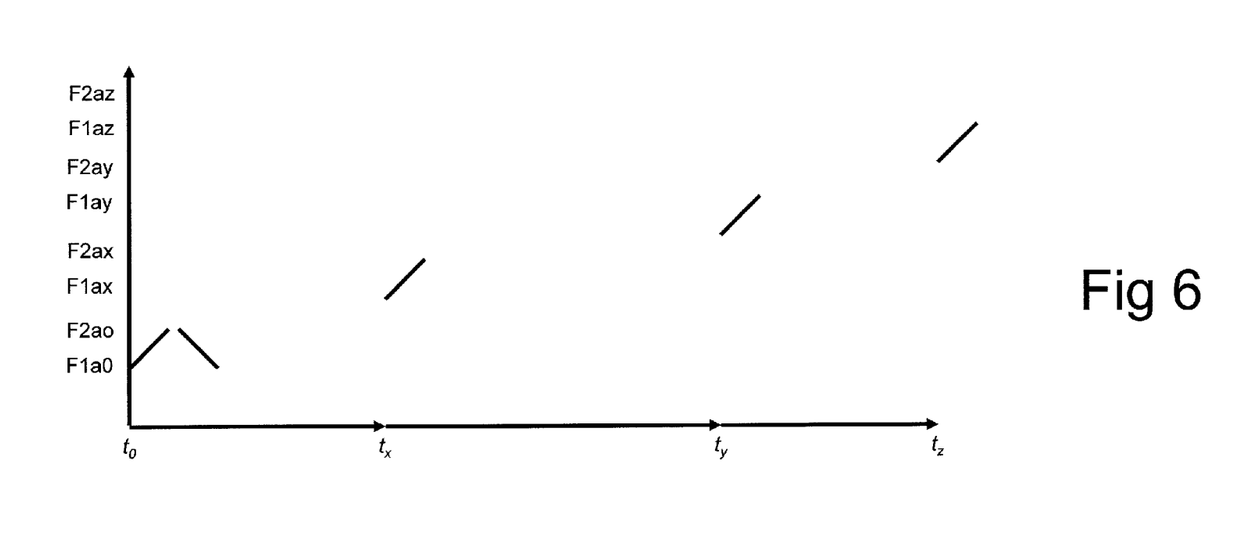
FIG. 6 shows a single pulse train where the pulses are in different frequency bands.

Optionally each chirp from each buoy may also occupy a different frequency band as shown in FIG. 6. In this example the chirps from the buoy 1a occupy four non-adjacent and non-overlapping frequency bands, where F1a0<F2a0<F1ax<F2ax<F1ay<F2ay<F1az<F2az. The chirps from the other two vehicles are also similarly distributed within their respective frequency band. The individual chirps are then de-multiplexed at the underwater vehicles based on their frequency by a process of cross-correlation. This process also induces pulse compression at the receiver, which improves the resolution in time of the pulse arrival at the receiver.

Figure 7:
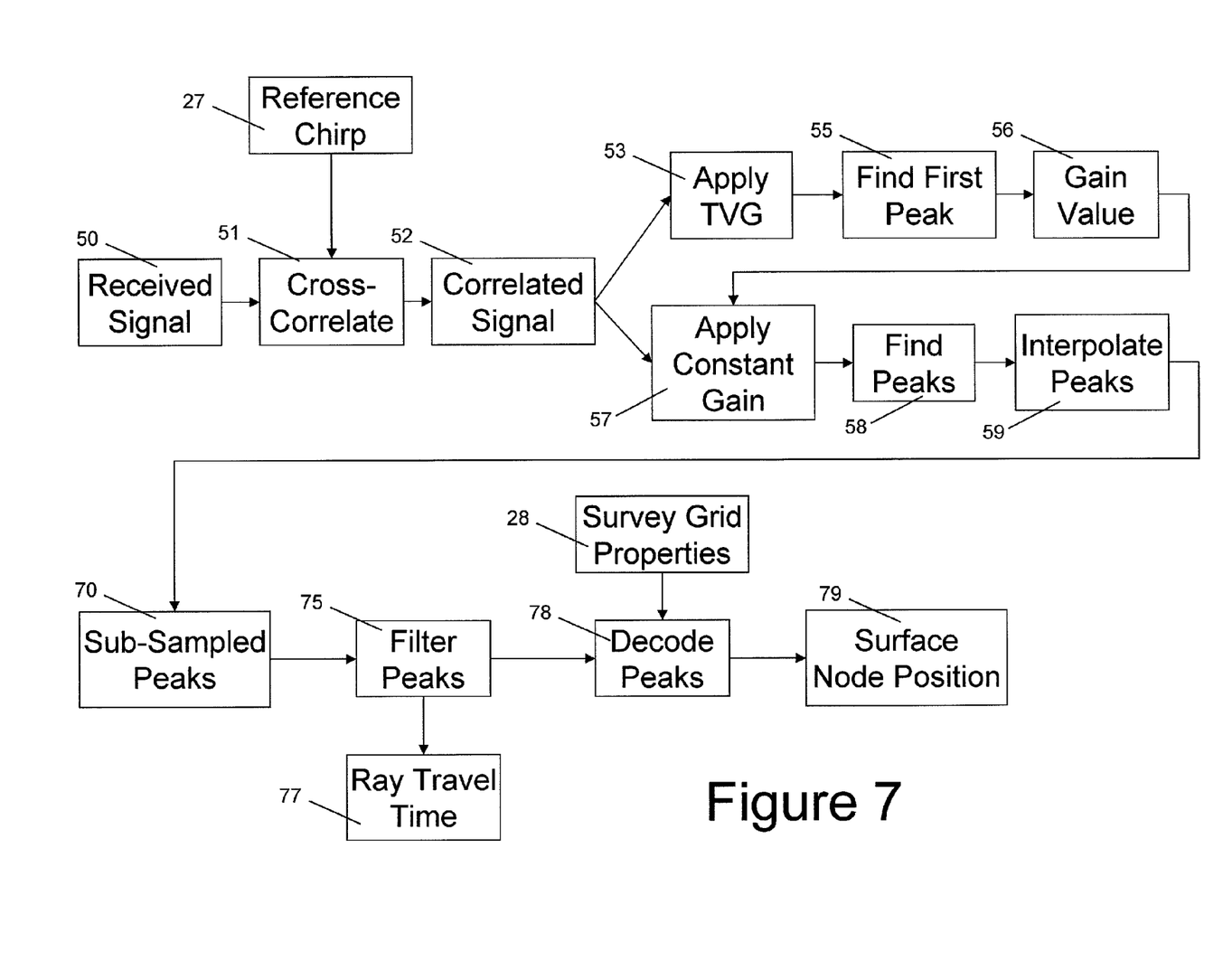
FIG. 7 shows a method of decoding the received signal to determine the buoy position.

In another example the pulse trains and/or individual chirps may be code-division-multiplexed (for instance by being mixed between up chirps and down chirps, or coded in some other way, perhaps by frequency hopping encoding) then de-multiplexed at the underwater vehicles based on their code The underwater vehicles 40a,b each have an acoustic antenna 44 for receiving the acoustic pulses 30-34, and a processor 45. The processor 45 measures the delays between the pulses 30-33, thereby determining the X, Y and Z co-ordinates of the buoys 1a-c. The process for doing this is shown in FIG. 7.

Figure 8:
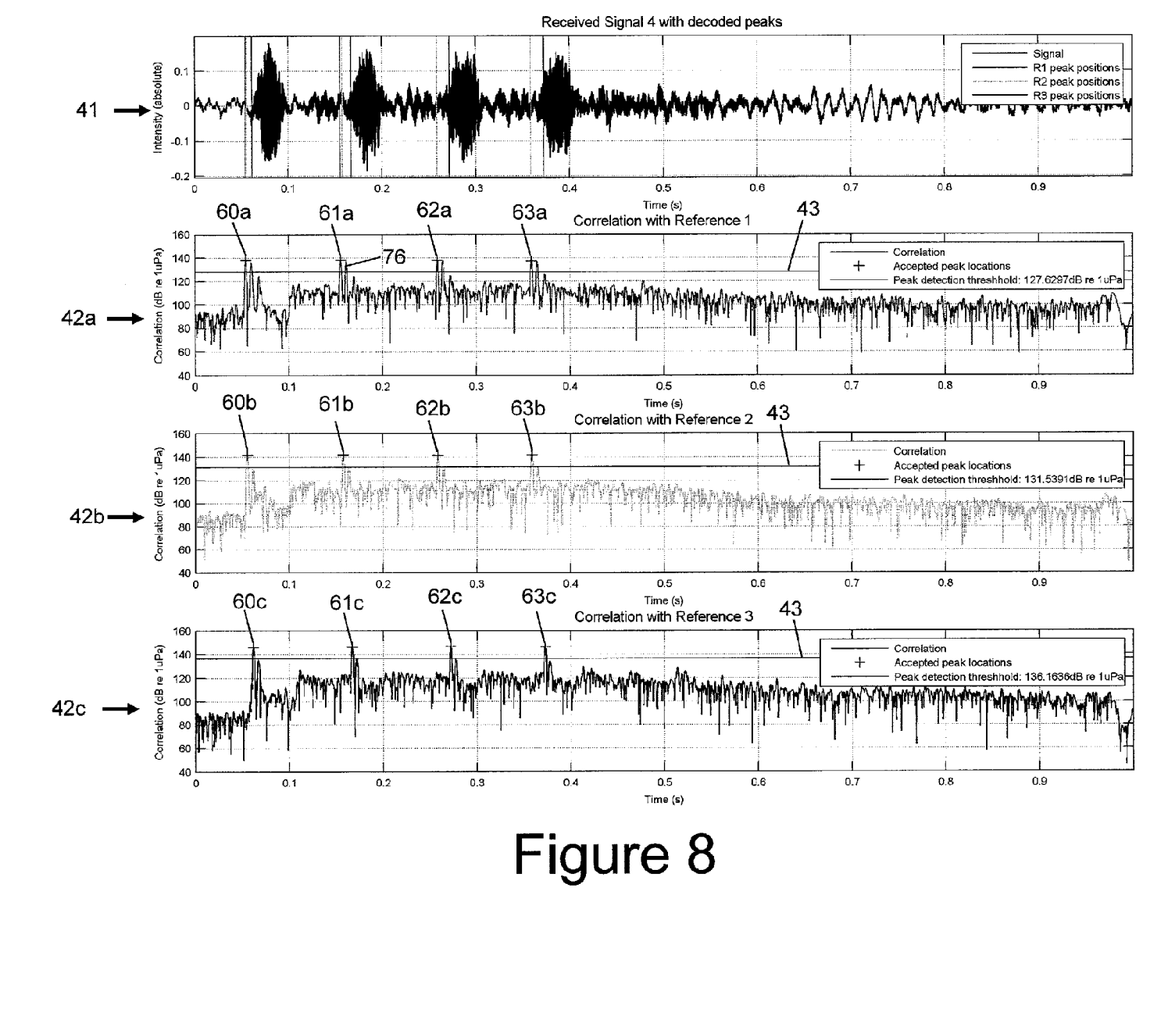
FIG. 8 shows the received signal and cross-correlated data derived from the received signal.

First the received acoustic signal data is received and stored at step 50. FIG. 8 shows the received signal data at 41 by way of example. Next this data is cross-correlated in step 51 with the reference chirp data 27 to generate cross-correlated signal data 52. The vehicles 40 and the buoys 1 have synchronised clocks so the vehicles know the time $t_0$ at which the buoys have transmitted the first pulse. At step 53 a time-variable gain is applied to the cross-correlated signal, the gain increasing constantly with respect to time after $t_0$. Once the first peak in the cross-correlated signal 52 has been detected at step 55 then the gain value 56 at that time is recorded and applied for subsequent parts of the cross-correlated signal data 52 at step 57. This time varying gain accounts for the fact that if the vehicle is far away from a buoy then the received signal will be weaker and delayed by a greater time than the received signal for a vehicle which is closer to the buoy 1. The graphs 42*a-c* in FIG. 8 show the cross-correlated data for the three buoys 1*a-c* after gain has been applied as described above.

In step 58 the four peaks in each of the signals 42*a-c* are determined by detecting when the signals have exceeded a predetermined threshold. Peaks 60*a-c*, 61*a-c*, 62*a-c* and 63*a-c* are shown in FIG. 8 for the signals 42*a-c* respectively along with the threshold 43. It can be seen that these all have a roughly equal amplitude.

Figure 9:
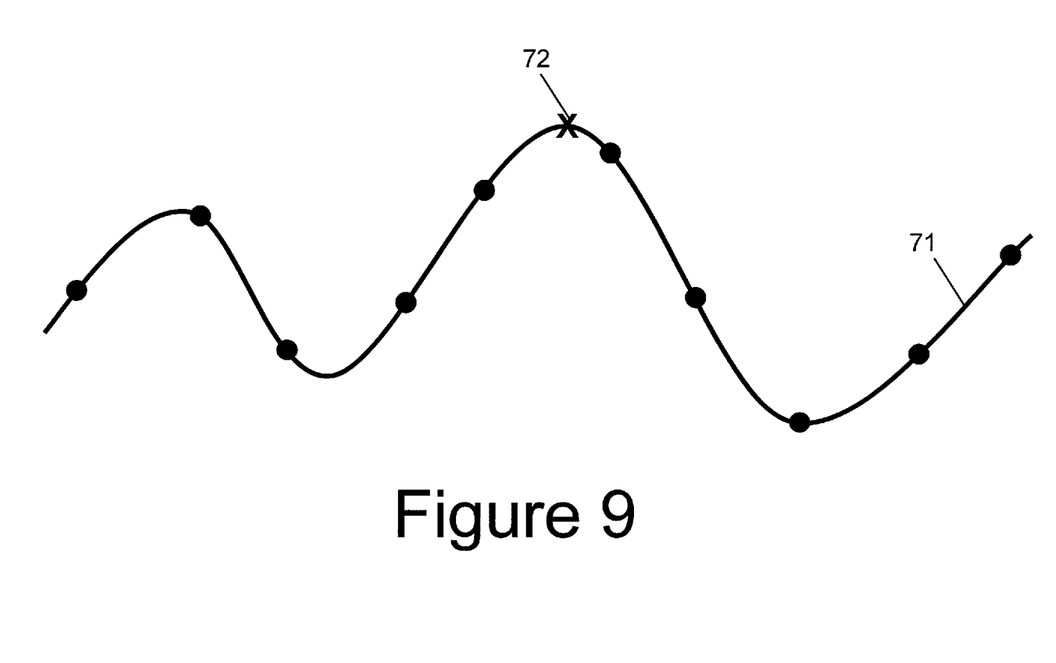
FIG. 9 shows an analog signal with sampling points.

Next the cross-correlated data is interpolated at step 59 to generate sub-sampled peak data 70. The process of interpolation is illustrated in FIG. 9. Signal 71 shows the analogue input data generated by a transducer and amplifier on the vehicle. An analog to digital converter samples the signal 71 at various points shown by dots in FIG. 9. The amplitude at the peak 72 is calculated by interpolating between the sampled data values on each side of the peak.

Returning to FIG. 7, the sub-sampled peak data 70 is then filtered and processed at step 75 by rejecting any echoes (for instance echo 76 shown in FIG. 8), and rejecting any peaks where the amplitude of the peak is too high relative to a previous peak, relative to some average peak value, or relative to a predetermined expected range of amplitude values.

Another output of step 75 is a ray travel time 77 which gives the time of receipt of the first peak 60*a-c* relative to the known time $t_0$ at which the first pulse was transmitted by the buoys 1*a-c*. Another output of step 75 is a set of filtered sub-sampled peak data which is decoded at step 78 in accordance with the grid property data 28 to determine the position 79 of the buoy. In other words the filtered sub-sampled peak data is decoded as follows:

$$t_0 - t_x \times (4096/0.1) = X \text{ co-ordinate in meters}$$

$$t_x - t_y \times (4096/0.1) = Y \text{ co-ordinate in meters}$$

$$t_y - t_z \times (4096/0.1) = Z \text{ co-ordinate in meters}$$

Figure 10:
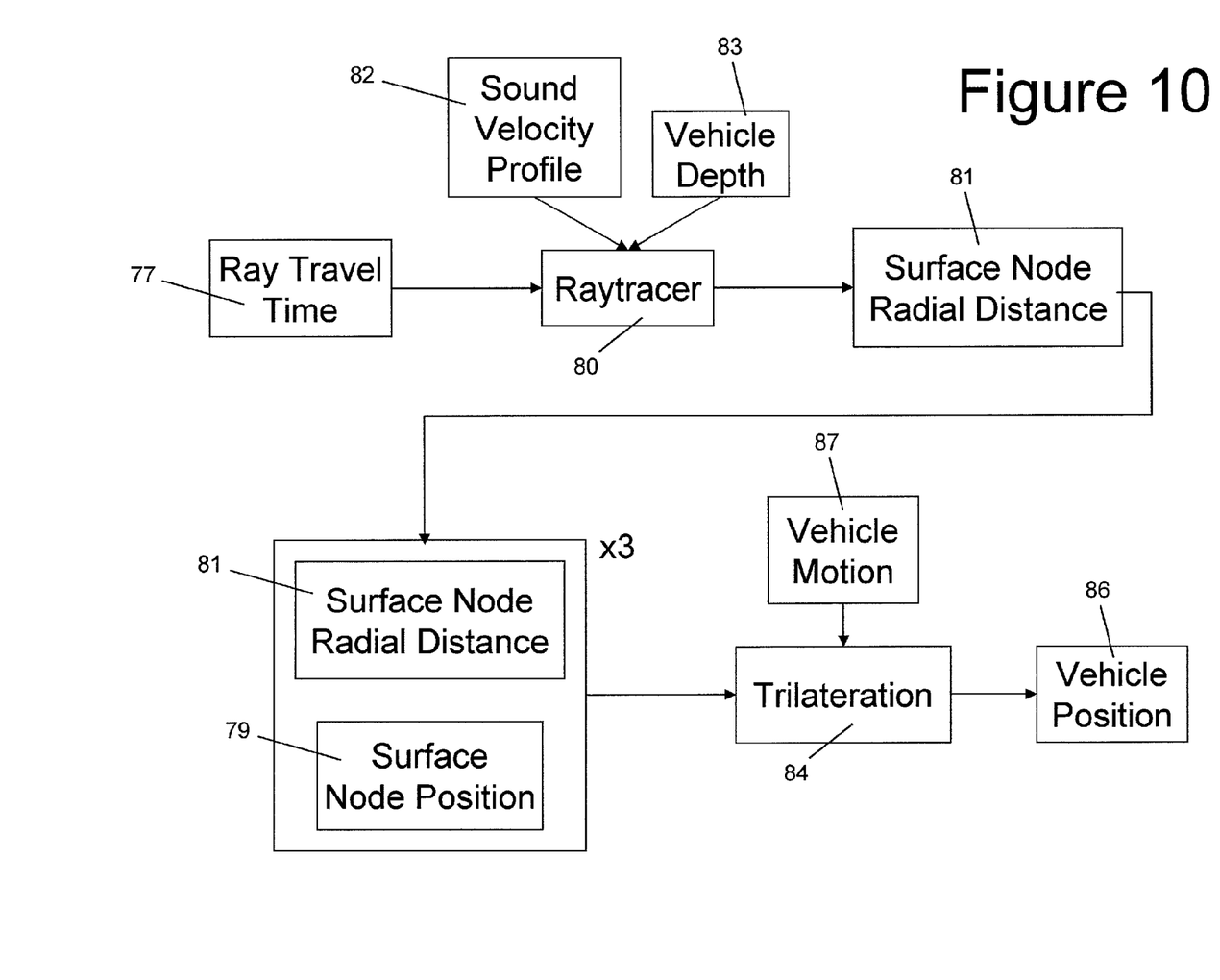
FIG. 10 shows a method of determining the position of the underwater vehicle from the ranges and positions of the buoys.

FIG. 10 shows how the data 77, 79 is used by each vehicle 40*a-c* to determine its position. In step 80 a raytracer algorithm determines a radial distance 81 in accordance with the ray travel time 77, a stored set of sound velocity profile data 82, and the vehicle depth 83 measured by a pressure sensor onboard the vehicle. This ray tracer algorithm 80 accounts for the fact that the sound waves will not travel in a straight line from the buoy to the vehicle due to the increase in pressure with depth.

The vehicle now has the radial distance (or range) 81 and position 79 of each one of the three buoys 1*a-c*. This data is than analyzed by a trilateration algorithm at step 84 to calculate the position 86 of the vehicle. An input to the trilateration algorithm is the velocity 87 of the vehicle (as measured by onboard algorithms which may interpret the data from devices such as accelerometers and/or as calculated based on previous position measurements). This takes into account the fact that the vehicle may have moved between receiving the first pulse and the last pulse, so the output 86 of the algorithm 84 is the position of the vehicle at the time that the last pulse was received.

Any errors in the measurements of the delays Δt between the pulses only translate into small errors in the X, Y or Z co-ordinates because of the proportionality between the delays Δt and the co-ordinate values X, Y and Z. Therefore if there is a gradual decrease of signal-to-noise ratio then the accuracy of the position estimate also degrades gradually.

The use of pulse position modulation also provides a low computation overhead in decoding and encoding.

The use of chirp pulses gives high processing gain due to their high bandwidth (processing gain being proportional to bandwidth multiplied by the period of the signal).

Although only two vehicles 40*a,b* are shown in FIG. 1 for purposes of simplicity, a large fleet of such vehicles may be provided (potentially 100 or more) for instance for the purpose of accurately distributing a grid of seismic sensors over a wide area of the seabed. The use of pulse position modulation for encoding the acoustic transmissions ensures that there is a relatively large time difference Δt between the pulses from a given buoy 1. This relatively large time difference provides time for any delayed versions of the original pulse, due to multipath effects, to be sufficiently attenuated so as not to cause interference with the current pulse. Thus the likelihood of inter-symbol interference is reduced compared with other encoding methods, such as frequency shift keying, which transmit each symbol consecutively. With such encoding methods it is not possible to increase the time between symbol transmissions without dramatically reducing the data rate of the communication channel.

Although the invention has been described above with reference to one or more preferred embodiments, it will be appreciated that various changes or modifications may be made without departing from the scope of the invention as defined in the appended claims.

The invention claimed is:

1. A method of determining a position of an underwater node, the method comprising:
   a. determining the positions of three or more transmitters;
   b. transmitting from each transmitter at least four pulses, wherein a time difference between each pulse and a previous one of the pulses is proportional to a respective co-ordinate of the position of the transmitter;
   c. receiving the pulses at the underwater node;
   d. decoding the pulses received at the underwater node by measuring the delays between them, thereby determining the co-ordinates of the transmitters;
   e. determining a range of each transmitter relative to the underwater node; and
   f. determining the position of the underwater node in accordance with the co-ordinates determined in step d. and the ranges determined in step e.

2. The method of claim 1 further comprising determining a velocity of the underwater node, wherein the position of the underwater node is determined in accordance with the co-ordinates determined in step d., the ranges determined in step e. and the determined velocity of the underwater node.

3. The method of claim 1 wherein the range of each transmitter is determined in step e. by detecting a time taken for at least one of the pulses to travel from the transmitter to the underwater node.

4. The method of claim 1 wherein the time difference Δt between each pulse and a previous one of the pulses is proportional to a respective co-ordinate (c) of the position of the transmitter node in accordance with the equation c=kt, where k is a co-efficient of proportionality.

5. The method of claim 1 wherein at least the second, third and fourth pulses from each transmitter are chirps which vary monotonically between a first frequency at the beginning of the pulse and a second frequency at the end of the pulse.

6. The method of claim 1 wherein at least the second, third and fourth pulses vary in frequency or period with respect to time in accordance with a predetermined function.

7. The method of claim 1 wherein the pulses from the transmitters have different frequencies or codes and are de-multiplexed at the underwater node based on their code or frequency.

8. The method of claim 1 wherein the pulses from the transmitters occupy non overlapping frequency bands.

9. The method of claim 1 wherein the pulses from the transmitters occupy non adjacent and non overlapping frequency bands.

10. The method of claim 1 further comprising:
receiving the pulses at one or more further underwater nodes;
decoding the pulses received at the further underwater node(s) by measuring the delays between them, thereby determining the co-ordinates of the transmitters;
determining the range of each transmitter relative to the further underwater node(s); and
determining the position(s) of the further underwater node(s) in accordance with the determined co-ordinates and ranges.

11. The method of claim 1 wherein the delays between the pulses are measured in step d. by: generating a signal from the received pulses; cross-correlating the signal with a pulse function to generate a cross-correlation signal; and measuring the measuring the delay between peaks in the cross-correlation signal.

12. The method of claim 11 further comprising: applying a time varying gain to the cross-correlation signal until a first peak is detected; detecting the value of the gain at that point; and applying the detected value of the gain to subsequent parts of the cross-correlation signal.

13. The method of claim 1 wherein step d. comprises determining the position of the underwater node in accordance with the co-ordinates determined in step d. and the ranges determined in step e. by a process of multi-lateration.

14. The method of claim 1 wherein the pulses are acoustic pulses.

15. Apparatus for determining the position of an underwater node, the apparatus comprising:
a. three or more transmitters, each transmitter comprising:
i. means for determining the position of the transmitter; and
ii. a processor arranged to cause the transmitter to transmit at least four pulses, wherein a time difference between each pulse and a previous one of the pulses is proportional to a respective co-ordinate of a position of the transmitter; and
b. a node comprising:
i. a receiver for receiving the pulses; and
ii. a processor arranged to decode the pulses received at the node by measuring the delays between them, thereby determining the co-ordinates of the transmitters; process the pulses received at the node to determine the ranges of the transmitters relative to the node; and determine the position of the node in accordance with the positions and ranges of the transmitters.

* * * * *